April 28, 1959      E. A. HENRY      2,883,860
AUTOMATIC ULTRASONIC INSPECTION
Filed Jan. 20, 1955      3 Sheets-Sheet 1

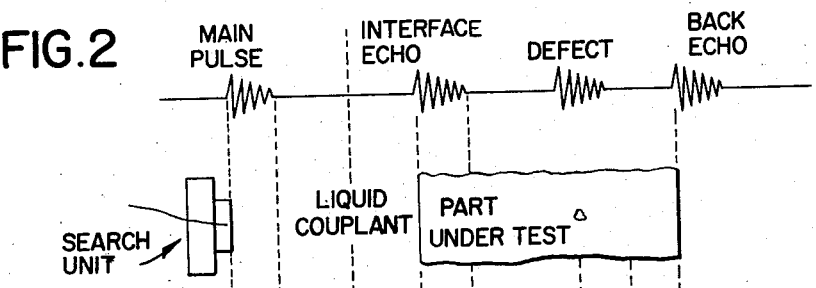
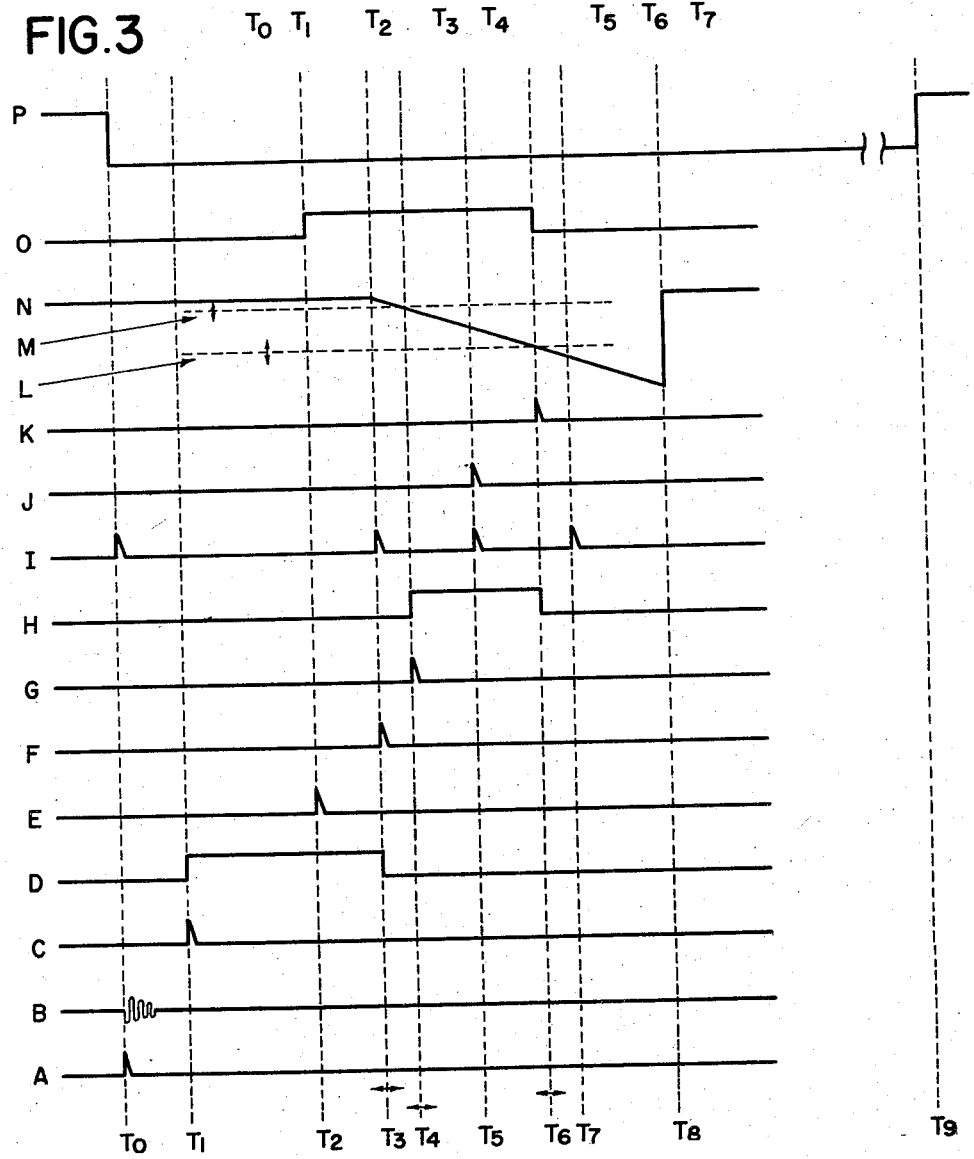

United States Patent Office 2,883,860
Patented Apr. 28, 1959

2,883,860

AUTOMATIC ULTRASONIC INSPECTION

Elliott A. Henry, Newtown, Conn., assignor to Sperry Products, Inc., Danbury, Conn., a corporation of New York Application January 20, 1955, Serial No. 482,961

2 Claims. (Cl. 73—67.9)

This invention relates to an electronic system for automatic ultrasonic inspection of engineering materials using pulsed ultrasonic echo ranging.

In automatic inspection of materials by ultrasonic pulsed echo ranging techniques, systems and equipment as disclosed in the patent to Floyd A. Firestone, No. 2,280,226, granted April 21, 1942, are inadequate. The reason for this is that automatic systems require automatic information sorting evaluation and recording that was previously done by an operator. For example, the operator may be able to view a cathode ray tube screen in a manual-type Reflectoscope, and distinguish a normal echo received from a boundary of the part from an echo received from a discontinuity which may be a defect within the part. However this discrimination must, in automatic inspection, be done by the equipment and only the defect be recorded or indicated. Furthermore, variations in distance between the transducer and the work piece must not be permitted to allow false or fixed echoes to be recorded or indicated. And finally the system must be capable of checking itself to insure stable operation.

It is therefore one of the principal objects of this invention to provide a method and means for sensitizing an amplifier at a predetermined time, equivalent to a predetermined distance below the entrant surface, after a random elapsed time (equivalent to random distance) from the generation of the ultrasonic pulse by the transducer. This random elapsed time may, for example, correspond to the random distance between the transducer and an irregular workpiece which is rotated on a turntable past the transducer to provide inspection from successive azimuths into the workpiece.

It is a further object to provide a method and means for desensitizing said amplifier at a predetermined time after a random elapsed time from the generation of the ultrasonic pulse by the transducer.

It is a further object to provide a method and means for automatically periodically checking operating performance and recording the results of the check.

Further objects and advantages of this invention will become apparent in the following detailed description thereof.

In the accompanying drawings,

Fig. 2 is a diagrammatic illustration of the time sequence involved in this inspection system.

Fig. 3 is a wave form chart showing the relative time sequences in the respective portions of the system.

Production inspecting

Figure 1:
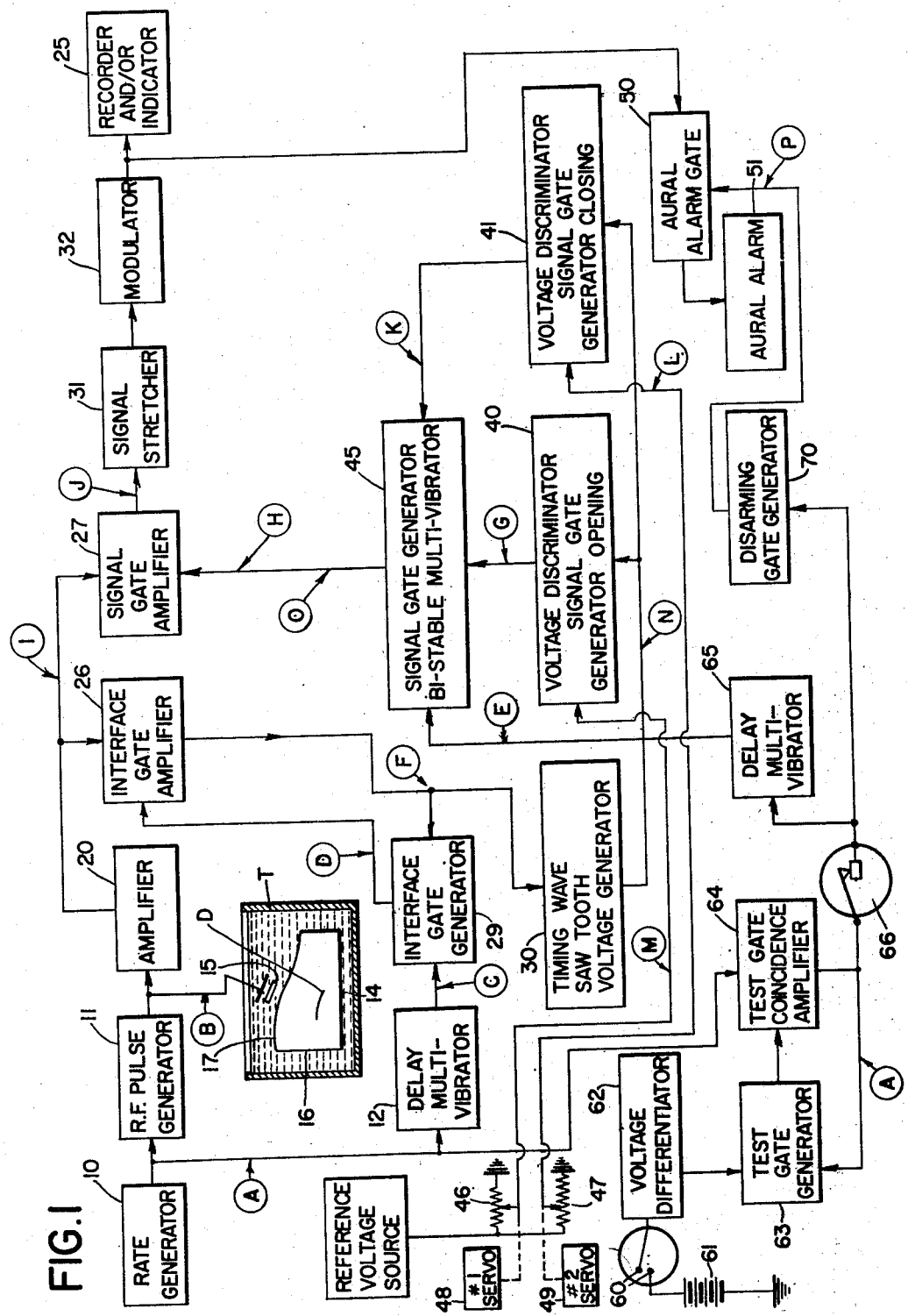
Fig. 1 is a block diagram of a pulsed ultrasonic inspection system embodying one form of this invention.

Referring to Fig. 1 of the drawings, the letters enclosed in circles correspond to the letters employed in Fig. 3. In Fig. 1, the rate generator 10 develops trigger pulses at time $T_0$ (see Figs. 2 and 3) and simultaneously triggers the R.F. pulse generator 11 and the delay multivibrator 12. As a result an R.F. pulse, or wave train, is generated by the R.F. pulse generator 11 and impressed on the transducer 15 and the preamplifier 20. The transducer converts the electrical wave train from pulse generator 11 into mechanical vibrations and transmits these mechanical vibrations into the coupling medium between the transducer and the work piece 16. As shown, the transducer and the work piece are submerged in a liquid couplant such as water within a tank T. If the coupling medium is water, the velocity of propagation will be approximately 16 microseconds per inch. The electrical wave train impressed upon the preamplifier 20 at $T_0$ will therefore have terminated a considerable time in advance of the arrival of the mechanical vibrations at the entrant surface 17 of the part and will have been rejected by both a normally closed interface gate amplifier 26 and a normally closed signal gate amplifier 27, since both these gates are closed at $T_0$.

The delay multivibrator 12 is adjusted to produce a trigger pulse at time $T_1$, a time after the R.F. wave train has terminated, but prior to the time of arrival of the mechanical vibrations at the entrant surface of the part. The delayed trigger from delay multivibrator 12 turns on the interface gate generator 29 which activates the interface gate amplifier 26 so that the latter now accepts the first reflected signal which is from the interface 17 at time $T_3$. The interface signal from the interface gate amplifier 26 immediately turns off the interface gate generator 29 which inactivates the interface gate amplifier 26 and prevents passage of any subsequent signals until reactivated on the following sequence of operation. The interface signal at time $T_3$ is also coupled to a timing wave generator 30 which generates a linear sawtooth of voltage. This timing wave is coupled to two voltage discriminators 40 and 41. The two reference voltages corresponding to the opening and closing times ($T_4$ and $T_6$) of the signal gate amplifier 27 are adjusted by potentiometers 46 and 47, which may be either hand operated or which may be controlled by closed loop servos 48 and 49 operated by stored data such as a punched tape or other means well-known to the art. This action may be obtained by making the signal gate generator 45 a bi-stable multivibrator turned on by a trigger from 40 and turned off by a trigger from 41. Discriminators 40 and 41 may be of the type known as multiar circuits and use a diode pick-off to produce a signal when the amplitude of the timing wave is equal to the reference voltage.

The signal gate amplifier 27 will then amplify and pass any defect echo signals between time $T_4$ and $T_6$, such as is shown at time $T_5$. The times between $T_3$ and $T_4$ and between $T_6$ and $T_7$ may be programmed to vary according to the geometry of the part, and the entrant surface of the part becomes the reference even though the time between $T_0$ and $T_3$ (equivalent to distance between search unit and workpiece) varies over wide limits. As fixed boundary echoes have been excluded, any signal occurring at the output of the signal gate amplifier 27 will be from an internal discontinuity or defect, and is stretched in the signal stretcher 31 and modulated at a low frequency by modulator 32 suitable for operating a recording pen motor. A modulated signal is preferable because it contains a zero reference that is lost in recording D.C. signals.

The aural alarm gate 50 is normally open to activate the aural alarm 51 when defects are encountered. The aural alarm gate 50 also functions as a voltage discriminator to prevent sonic noise signals from actuating the alarm.

Self-checking of the system

In any automatic inspection system it is important to insure that the performance of the equipment is maintained. This is especially true in pulsed echo ranging systems since in these systems the absence of signals indicates the absence of defects. In other words the system is not "fail safe." The following provision has been made to prevent this condition from occurring and to make the system "fail safe." A pulse of voltage is generated periodically by the scanning mechanism which may for example include a microswitch 60 momentarily closed by a finger on a turntable drive mechanism if a circular scan of the workpiece is used. Therefore once each revolution of the turntable, switch 60 is momentarily closed and this pulse of voltage is differentiated at 62 so that the leading edge is the reference signal. The test gate 64 is a coincidence circuit and normally closed. One input receives trigger signals continually at $T_0$, but these do not appear in the output as the gate is closed. Now the check signal from switch 60 turns on a test gate generator 63 which may be a bi-stable multivibrator which in turn opens the test gate 64. The first trigger pulse from the rate generator 10 at time $T_0$ that arrives after the gate has opened appears at the output and turns off the test gate generator 63 as well as being coupled to a delay multivibrator 65 through a switch 66. The switch 66 permits the self-checking feature to be cut out if desired. This method permits the selection of only one check pulse each test period, for example once during each turntable revolution for the case of a circular scan. The echo records establish operativeness of the system at these intervals as described below.

The selected trigger from test gate 64 at time $T_0$ is delayed by the delay multivibrator 65 until time $T_2$ (subsequent to the opening of the interface gate amplifier 26 but prior to the time of arrival of the interface signal) and at that time ($T_2$) the output signal from multivibrator 65 opens the signal gate generator 45. Thus the signal gate amplifier 27 is sensitive at the time of arrival of the interface signal and therefore the interface signal is passed and recorded as a check signal. See Fig. 4, for a view of these check signals 72 on a scanning chart. This figure also shows the record of defects and the record of a complete check ring 74. The latter is obtained by having the gate programmed to permit opposite boundary signals from the workpiece to be recorded for one complete revolution of the turntable, thus providing a complete system check.

Aural alarm disabled during system checks

The aural alarm 51 is actuated by a defect signal, but the check signal is prevented from actuating the alarm by providing alarm gate 50. This is a coincidence circuit that is normally conducting in both channels but is inactivated by the disarming gate generator 70 in the following manner. The trigger from the test gate 64 at $T_0$ turns on the disarming gate generator 70 which comprises a mono-stable multivibrator whose quasi-stable state is set for about 10 percent less than the time of pulse repetition. The step wave so generated is used to inactivate the aural alarm gate 50 for the period $T_0$ to $T_9$.

Figure 4:
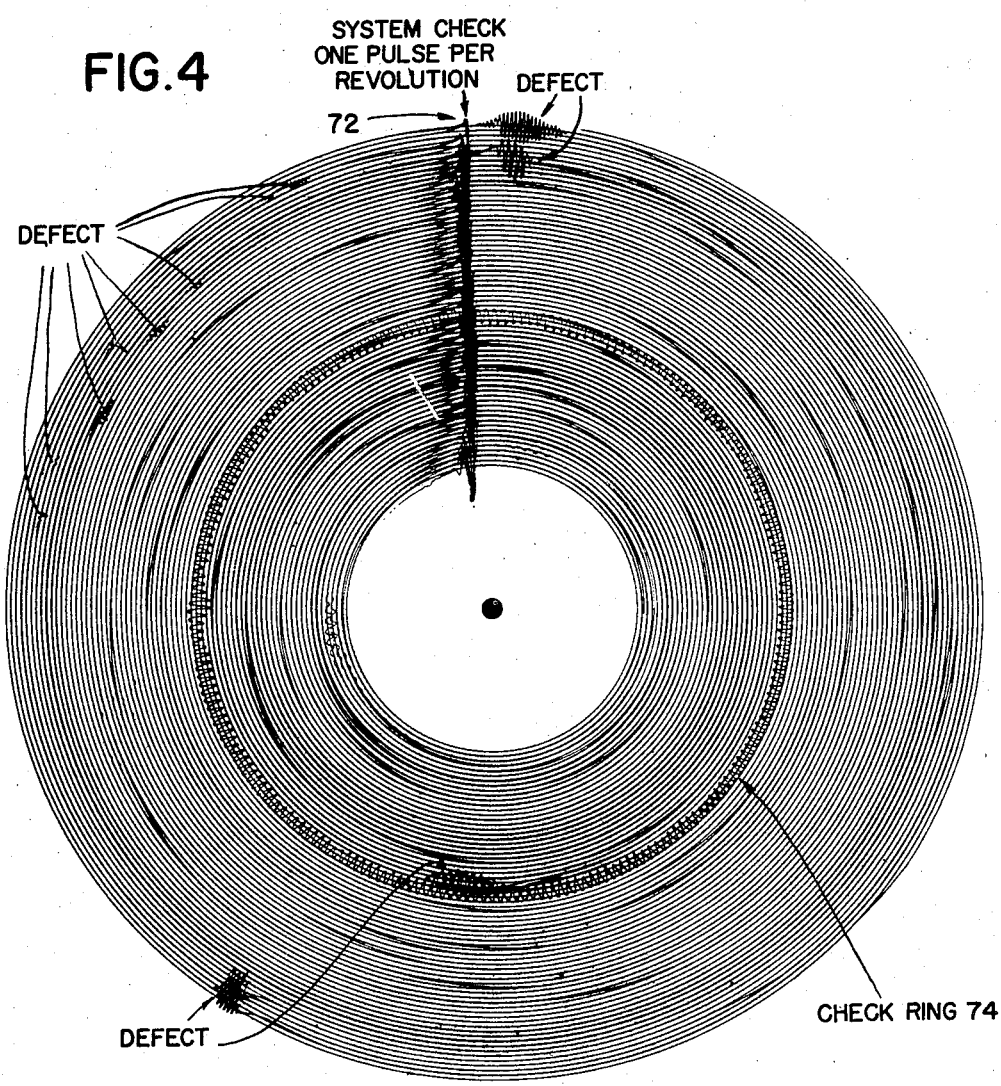
Fig. 4 is a plan view of a recording chart illustrating the method of checking the inspection system.

The type of multi-ring record shown in Fig. 4 is obtained by circular scan of a workpiece, the different rings corresponding to a programmed displacement of the transducer to various levels (above the turntable) of the workpiece. The record provides a permanent reference showing the presence of any defects in that particular workpiece, and includes evidence (72, 74) that the testing system was operative throughout the test. However, the particular programming and scanning scheme represented by this example forms no part of the invention claimed herein, and may be widely varied to suit the necessities of each case, as will be apparent to those skilled in the art.

Having described my invention, what I claim and desire to secure by Letters Patent is:

1. Ultrasonic inspection apparatus comprising a source of high-frequency pulses, a trigger generator for energizing said source at periodic times, a transducer connected to said source to introduce said pulses into a workpiece over an entrant surface thereof, a normally closed interface gate amplifier and a normally closed signal gate amplifier both connected to said transducer, a delay pulse generator driven by said trigger generator for producing a control pulse after a time delay greater than the energization time of said source, but less than the time required for a pulse from the transducer to arrive at the workpiece entrant surface, gate control means controlled by said control pulse for opening said interface gate amplifier, and means controlled by the output of said interface gate amplifier for thereupon disabling said gate control means to close said interface gate amplifier; means responsive to the output of said interface gate amplifier, when open, for initiating a timing sweep signal, voltage discriminator gates controlled by the sweep signal amplitude, a signal gate generator connected to the outputs of said discriminator gates for generating a pulse whose start and stop times are controllable by the adjustment of said discriminator gates and hence in accordance with the rise of amplitude of the timing sweep signal to preset levels, a connection from said signal gate generator to said signal gate amplifier to open the latter only for the interval defined by said start and stop times, and means controlled by said signal gate amplifier for indicating the occurrence of signals reflected from the interior of said workpiece to said transducer during the interval selected by said discriminator gates.

2. Ultrasonic inspection apparatus comprising a source of high-frequency pulses, a trigger generator for energizing said source at periodic times, a transducer connected to said source to introduce said pulses into a workpiece over an entrant surface thereof, a normally closed interface gate amplifier and a normally closed signal gate amplifier both connected to said transducer, means controlled by said trigger generator for producing a control pulse after a time delay greater than the energization time of said source, but less than the time required for a pulse from the transducer to arrive at the workpiece entrant surface, gate control means controlled by said control pulse for opening said interface gate amplifier, and means controlled by the output of said interface gate amplifier for thereupon disabling said gate control means to close said interface gate amplifier; adjustable timing means connected for energization by the output of said interface gate amplifier, means connecting said timing means to said signal gate amplifier to open the latter only for the interval defined by said timing means, and means controlled by said signal gate amplifier for indicating the occurrence of signals reflected from the interior of said workpiece to said transducer during the interval selected by said timing means.

References Cited in the file of this patent

UNITED STATES PATENTS

| | | |
|---|---|---|
| 2,562,449 | De Lano | July 31, 1951 |
| 2,646,555 | Straehl | July 21, 1953 |
| 2,682,766 | Van Valkenburg | July 6, 1954 |